(12) United States Patent
Hall

(10) Patent No.: US 7,038,426 B2
(45) Date of Patent: May 2, 2006

(54) METHOD FOR PROLONGING THE LIFE OF LITHIUM ION BATTERIES

(75) Inventor: John C. Hall, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 280 days.

(21) Appl. No.: 10/737,335

(22) Filed: Dec. 16, 2003

(65) Prior Publication Data

US 2005/0127875 A1    Jun. 16, 2005

(51) Int. Cl.
*H02J 7/00* (2006.01)

(52) U.S. Cl. ...................................... 320/135

(58) Field of Classification Search ................ 320/135, 320/119, 125, 134; 429/90, 120; 700/231
See application file for complete search history.

(56) References Cited

U.S. PATENT DOCUMENTS

| | | | |
|---|---|---|---|
| 5,543,245 A * | 8/1996 | Andrieu et al. | 429/90 |
| 6,239,578 B1 * | 5/2001 | Schnell et al. | 320/119 |
| 6,433,511 B1 * | 8/2002 | Bohne | 320/131 |
| 6,618,644 B1 * | 9/2003 | Bean | 700/231 |
| 6,660,428 B1 * | 12/2003 | Hall | 429/120 |
| 6,737,830 B1 * | 5/2004 | Bean et al. | 320/125 |
| 2002/0168567 A1 | 11/2002 | Hall | |
| 2002/0187372 A1 | 12/2002 | Hall et al. | |

* cited by examiner

*Primary Examiner*—Pia Tibbits
(74) *Attorney, Agent, or Firm*—McNees Wallace & Nurick LLC

(57) ABSTRACT

A method for reconditioning lithium ion batteries in-situ to restore their capacity. The battery capacity is reduced by a reversible mechanism. The process for reconditioning a battery includes providing a power source and connecting the power source to a lithium ion battery. The lithium ion battery is slowly discharged at a predetermined voltage sufficiently high so as not to damage the battery cells and sufficiently low so to completely extract all lithium from the negative electrode and fully reincorporate it in the positive electrode, while the battery is being completely discharged. After the battery has been completely discharged, power is provided to the battery from the power source to recharge the lithium ion battery so as to uniformly redistribute the lithium in the negative electrode. The discharge cycle is repeated a plurality of times. Upon completion of recharging, the capacity of the battery is restored.

23 Claims, 3 Drawing Sheets

METHOD FOR PROLONGING THE LIFE OF LITHIUM ION BATTERIES

FIELD OF THE INVENTION

The present invention is directed to lithium ion batteries and specifically to a method of extending the life of lithium ion batteries used in satellites.

BACKGROUND OF THE INVENTION

An electrochemical battery stores electrical energy by an electrochemical reaction termed charging, and then later delivers the stored electrical energy by reversal of the reaction, termed discharging. An event of discharging constitutes one-half of a cycle and an event of charging constitutes one half of the cycle, so that a single battery cycle includes consecutive events of discharging and charging. The battery is typically formed of a number of individual electrochemical cells. Each electrochemical cell has characteristic voltage and current properties. The electrical cells are electrically interconnected to provide the desired voltage and current characteristics required for the battery.

A typical lithium ion battery cell includes a negative electrode, a positive electrode, a separator between the negative electrode and the positive electrode, and an electrolyte that saturates the separator and provides a lithium ion path between the negative electrode and the positive electrode. The negative electrode typically has a negative current collector contacting the negative electrode active material, and a positive current collector contacting the positive electrode active material. The negative electrode active material releases lithium ions upon discharging of the battery cell and absorbs lithium ions upon charging of the battery cell. The positive electrode active material reacts with lithium ions upon discharging of the battery cell and releases lithium ions upon charging of the battery cell. A lithium ion battery incorporates at least two, and typically a large number, of these cells within a container. These cells are wired in series to achieve the desired voltage.

Each current collector provides an electrical current flow path between its respective electrode active material and a terminal, and thence to an external circuit. The current collector is a metal that is resistant to corrosion in the electrolyte, typically copper for the negative current collector and aluminum for the positive current collector. There must be good mechanical adhesion between each of the current collectors and its respective active material. A low electrical resistance at the interface between the current collector and the active material is also important, because the interface is in series with the current flow and imposes an interface impedance on the current flow.

Lithium ion batteries experience a steady loss in capacity when operated in a continuous cyclic regime. Since lithium batteries are expensive to replace, and in some applications, such as satellite applications, virtually impossible to replace, what is needed is a means to restore the capacity of lithium ion batteries without replacing the batteries.

SUMMARY OF THE INVENTION

The present invention provides a method for reconditioning lithium ion batteries in-situ to restore their capacity. Over time, these batteries experience a decrease in capacity. Since these lithium ion batteries are utilized in space applications such as satellites, where their replacement is impossible or prohibitively expensive, it is highly desirable to extend their useful life by restoring their capacity. These batteries can also find application in non-satellite applications, such as electric vehicles and hybrid vehicles, where their replacement is not impossible, but nevertheless expensive.

Lithium ion batteries are known to evidence a steady loss in capacity when operated in a cyclic regime, and this loss in capacity has been attributed to the reaction of lithium intercalated in a carbonaceous negative electrode with the electrolyte, or electrolytic solution. This loss in capacity is explained by the equation:

$$2Li + C_3H_4O_3 \rightarrow Li2CO_3 + C_2H_4 \epsilon_{H,298} = 3.02 \text{ V} \qquad (1)$$

where $\epsilon$ is electromotive force.

The reaction set forth in equation (1) above is irreversible; that is, it represents a permanent loss of battery capacity.

However, it has been discovered that battery capacity is also reduced by a second mechanism that is reversible The process for reconditioning a battery whose capacity has been reduced by this second mechanism is the subject of this invention. This process is generally set forth in the following steps. The process includes providing a power source and providing a lithium ion battery. The lithium ion battery typically includes a negative electrode, a positive electrode, a nonconductive separator disposed between the negative electrode, such as a carbon based negative electrode, and the positive electrode; such as a metal oxide based positive electrode, and a source of lithium and an electrolyte solvent hermetically sealed in a container, and further including a negative terminal connected to the negative electrode and a positive terminal connected to the positive electrode extending through a face of the container to provide external connections. The power source is connected to the battery terminals, as is well known in the art.

In order to practice the present invention, the lithium ion battery is slowly discharged at a predetermined voltage sufficiently high so as not to damage the battery cells. This predetermined voltage is a voltage above a destructive voltage limit, which is characteristic for a battery family. The discharge rate is also sufficiently low so to completely extract all lithium from the negative electrode and fully reincorporate it in the positive electrode, while the battery is being completely discharged. The discharge rate will vary depending upon the degree of discharge of the battery. After the battery has been completely discharged, power is provided to the battery from the power source to recharge the lithium ion battery so as to uniformly redistribute the lithium in the negative electrode. Upon completion of recharging, the capacity of the battery, previously reduced as a result of the reversible mechanism is restored.

The process described in the preceding paragraph is effective in restoring capacity to the battery, as such batteries typically have a limited number of sites available in the positive electrode for lithium storage, as compared to the negative electrode. In normal operation, the difference in sites for lithium storage leads to an accumulation of lithium at low resistance locations in the negative electrode and starvation of lithium in other parts of the electrode. In this state of nonuniform distribution, there is an absence of lithium in opposed regions of the positive electrode, which prevents the high rate discharge of the cell in these electrode locations and effectively reduces battery capacity. This reduction in battery capacity increases with increased number of standard charge/discharge cycles. Redistribution of the lithium thus restores the balance between the two electrodes, increasing battery capacity and prolonging battery life.

An advantage of the present invention is that the process of the present invention can extend the useful life of a lithium ion battery. When these batteries are used on satellites, extending the life of the battery can extend the life of the satellite. On vehicles such as electric automobiles or hybrid automobiles, extending the life of the batteries can delay replacement of batteries.

Another advantage of the present invention is that the process can be accomplished remotely or can be initiated automatically after a predetermined number of battery cycles.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
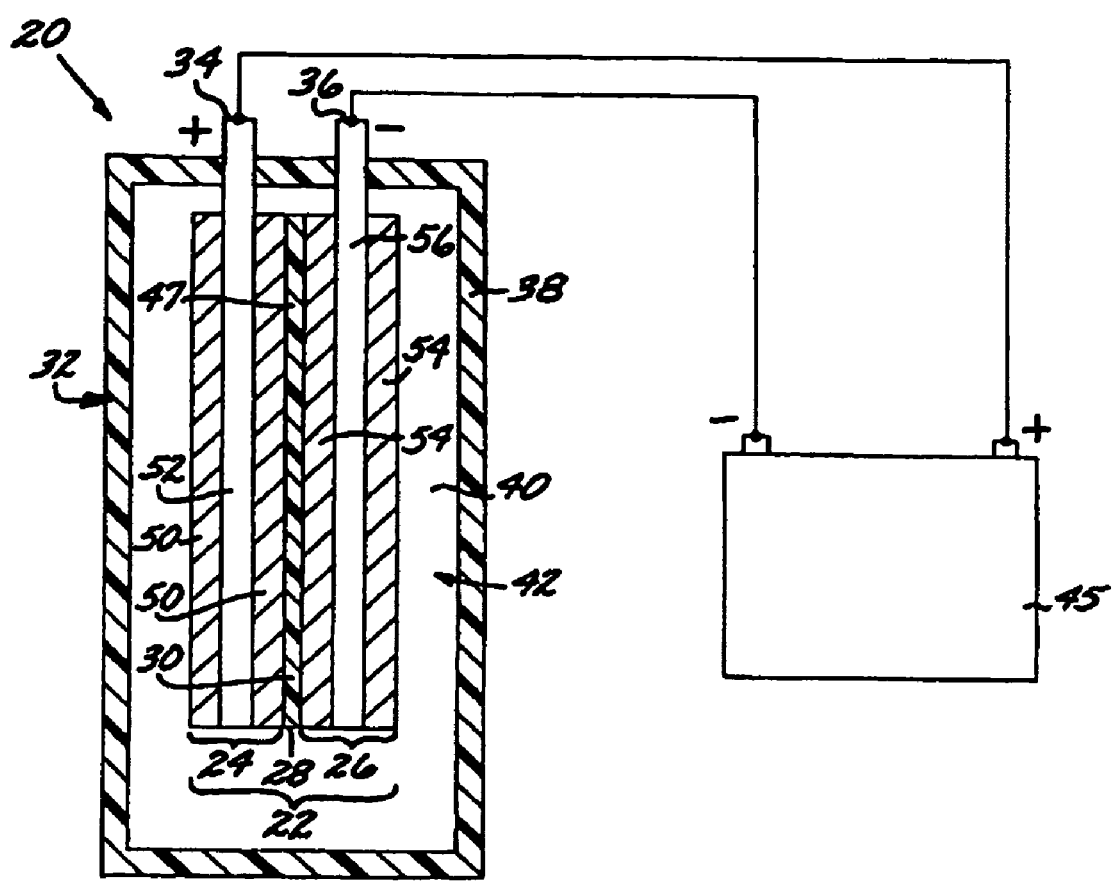
FIG. 1 is a schematic sectional view of a metal oxide/carbon electrochemical cell.

The present invention provides a method for reconditioning a lithium ion battery. FIG. 1 schematically illustrates an electrochemical cell 20. The electrochemical cell comprises an active element 22. A single active element 22 is shown in the drawing, but there are typically multiple active elements in each electrochemical cell 20. The active element 22 includes an anode 24, a cathode 26, and a separator 28, made of a porous, electrically nonconductive material, disposed between the anode 24 and the cathode 26. An electrolytic solution 30 enabling ion transport is disposed between the anode 24 and the cathode 26. The electrolytic solution 30 is typically impregnated into the porous separator material. The active element 22 is enclosed within a sealed housing 32. The housing 32 is hermetically sealed against leakage of the contents of the sealed housing 32 and against intrusion of external elements. Leads 34 and 36 for the anode 24 and for the cathode 26, respectively, extend through a wall 38 of the sealed housing 32 to provide external connection to the anode 24 and to the cathode 26. Electrical current is carried to and from the anode 24 of each electrochemical cell 20 through the lead 34. Electrical current is carried to and from the cathode 26 of each electrochemical cell 20 through the lead 36.

The anode 24 typically is formed as layers of an anode active material 50 supported on each side of an anode current collector 52. The cathode 26 typically is formed as layers of a cathode active material 54 supported on each side of a cathode current collector 56. The current collectors 52 and 56 are in electrical communication with the respective leads 34 and 36. In the case of the lithium-ion cell of the present invention, the anode active material 50 releases lithium ions 47 upon discharging of the electrochemical cell and accepts lithium ions 47 upon charging of the electrochemical cell. The cathode active material 54 accepts lithium ions 47 upon discharging of the electrochemical cell and releases lithium ions 47 upon charging of the electrochemical cell.

The anode current collector 52 and its anode active material 50, the cathode current collector 56 and its cathode active material 54, the separator 28, and the electrolyte 30 may be made of any operable materials used for lithium ion batteries and have any operable physical arrangement and form. A number of operable materials and physical arrangements are known in the art.

Figure 2:
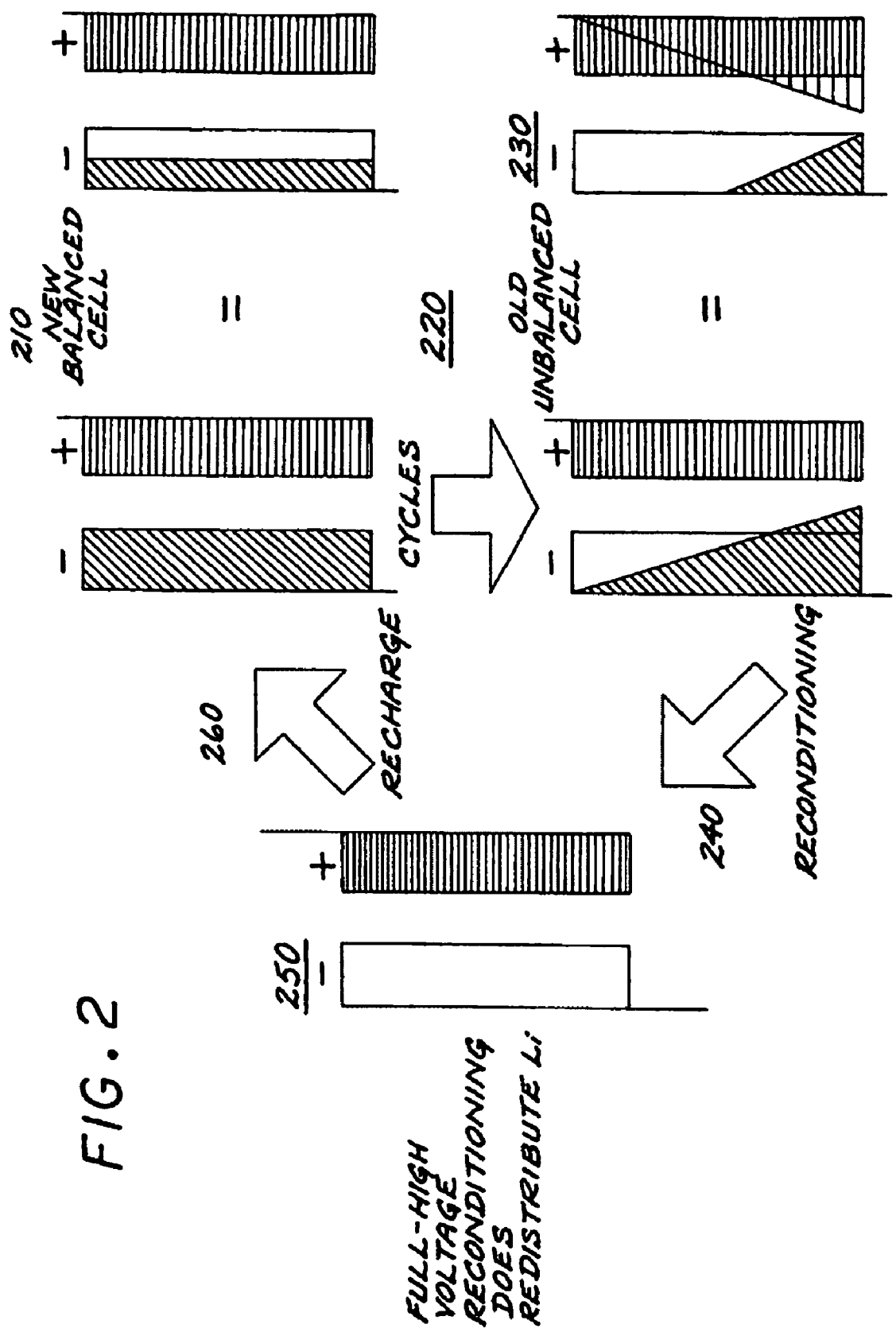
FIG. 2 depicts the distribution of lithium atoms within a cell over a period of time and as a result of the reconditioning process of the present invention.

Without wishing to be bound by theory, the behavior of lithium ion batteries suggests that the capacity of such batteries is reduced due to the redistribution of lithium in the negative electrode. This reduction can occur as a result of extended cycling, even though the active lithium content within the battery has not changed. Referring now to FIG. 2, the operation of a lithium ion battery results in lithium atoms, nominally uniformly distributed over the surface area of the negative electrode in a balanced cell, being transferred between the negative and positive electrodes 210 as the battery is alternately discharged and charged. The anode 24 and cathode 26 provide sites for storage of lithium atoms in the reduced and oxidized states respectively. The energy storage capacity of the battery is a result of storage of lithium in the two valence states. By design, there are more storage sites for lithium atoms in the anode 24 than there are active lithium atoms. These excess sites are provided to prevent the deposition of metallic lithium on the anode, which is a destructive process. Even if this were not the case, the reaction set forth in equation 1, above, would lead to this result, as active lithium is depleted while the carbon substrate remains.

As FIG. 2 further illustrates at 220, repeated cycling of the battery results in redistribution of the nominal uniform distribution of the lithium atoms so that atoms are no longer uniformly distributed over the electrode surface. The redistribution process may be caused by a number of factors. For example, redistribution may be driven by local variations in current density that result in a practical cell where current collectors, which pass the current to the cell terminal, lead to current density variations across the electrode face, and hence variations in lithium atom reaction rates across the cell. As illustrated in FIG. 2 at 220, a non-uniform distribution of lithium results. At the end of cell discharge, portions of the anode 24 are depleted of lithium before the cell is fully discharged. The finite resistance of the electrolyte leads to an apparent loss of capacity at a predetermined current density. Thus, although the chemical capacity of the cell still exists, it has been redistributed in such a way that the reactants are no longer adequately mixed to support the reaction at the load demand rate.

The present invention provides the reconditioning process, FIG. 2 at 240, that restores the battery to the balanced state 210. This process completely discharges the unbalanced cell at 230, causing the lithium atoms to reintercalate uniformly over the surface of the positive electrode. Subsequent recharging of the battery cell, by connecting it to a power source, shown as 45 in FIG. 1, uniformly distributes the lithium ions such as shown in FIG. 2 at 210. This redeposition of the lithium atoms over the surface of the positive electrode essentially returns the battery cell to the new as-built state.

Normal discharging occurs at a rate much too high to uniformly redistribute the lithium ions. However, the process of the present invention achieves the redistribution of the lithium ions at a voltage sufficiently high so as to prevent irreversible positive electrode reactions, and for a time sufficiently long, and at a current sufficiently low, to allow significant migration of the lithium from the negative electrode over the face of the positive electrode, as illustrated in FIG. 2 at 250. But if the discharge is accomplished at too low of a voltage, the cell may be damaged as (a) the negative electrode current collector may dissolve, replating on the positive electrode, and cause the growth of shorting dendrites, thereby rendering the cell inoperative; and (b) at a sufficiently low voltage, the cathode reaction may become irreversible. Both of these processes are prevented by fixing the cell voltage at a value which precludes their occurrence, typically greater than about 2.0 volts and preferably greater than about 2.7 volts and discharging the cell to that voltage.

Figure 3:
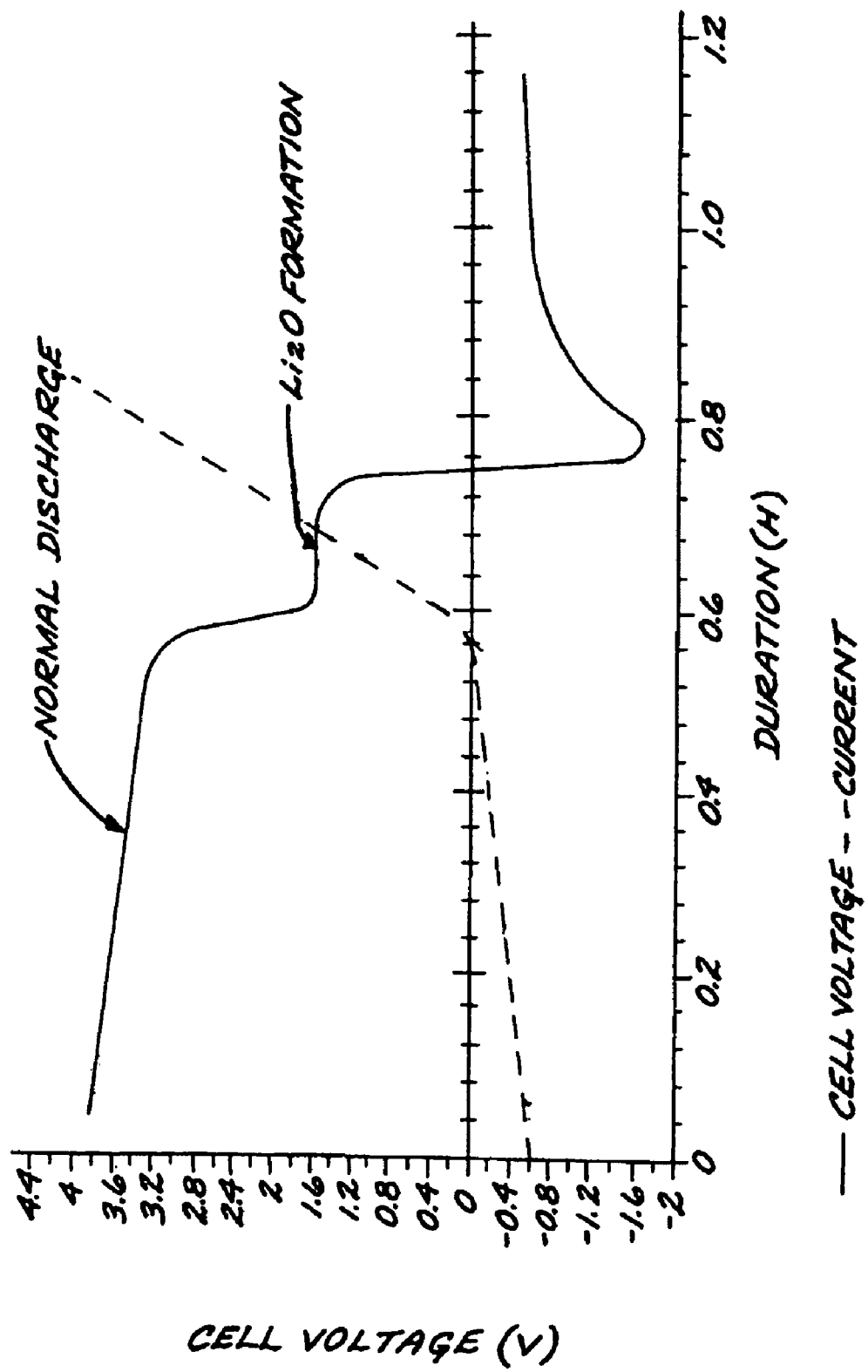
FIG. 3 is a voltage discharge profile for a lithium ion battery having a nickel oxide based cathode.

The variables of voltage and time which must be achieved during such a discharge will depend on the specific design of a battery family. Referring now to FIG. 3, there is depicted the voltage discharge profile for a lithium ion battery employing a nickel oxide based positive electrode and a carbon-based negative electrode. The electrolyte is an electrolytic solution of $LiPF_6$, phosphor hexachloride liquid and an organic carbonate. As can be seen, there is a characteristic step in the voltage at about 1.6 volts. It is believed that this step is due to low-voltage irreversible formation of lithium oxide, as discussed above. The consequence of operating this cell at a voltage below this lower step of 1.6 volts is expected to be a gradual loss of cell capacity leading to an inoperative cell. The second plateau, which is displayed to the left of the step of 1.6 volts, occurs at a relatively constant voltage, representative of normal discharge. It will be understood by those skilled in the art that there are certain variables, such as time, voltage and/or current, which will vary depending upon the specific materials comprising the elements of the battery, and it is not the intention of the present invention to list every known materials combination to determine the specific values of these variables. Those having skill in the art, provided with the knowledge of the present invention, can readily determine the specific values of these variables.

The present invention accomplishes the reconditioning of the battery by discharging the battery cell by fixing the lower discharge voltage limit above the characteristic voltage step of 1.6 volts for this lithium ion battery employing a nickel oxide based positive electrode and discharging the battery to this lower discharge voltage limit. This reconditioning process has been demonstrated to be effective on a number of batteries. The discharge voltage limit was maintained at about 2.7 volts for each discharge cycle. This voltage was also set below the normal discharge voltage. Each cell was discharged at C/n to the fixed voltage limit for the battery, where C represents the rated capacity of the cell or battery. For example, a discharge cycle of C/2 represents discharging the battery to half of its capacity. These steps were carried out a plurality of times. It was found that, while discharging a lithium ion battery employing a nickel oxide based positive electrode to the voltage constant limit at a temperature of about 20° C. (68° F.) to a capacity of about C/8192, the cell was fully discharged and the negative electrode was fully depleted, without allowing the positive electrode to operate at an irreversible and ineffective voltage. The value of C/n will vary based on battery design, and while C/8192 is effective for lithium ion batteries employing nickel oxide-based cathodes, a different C/n number is effective for a different battery family. The battery is reduced in stages to a value of C/n where n approximately equals a value of $2^x$, where x represents each successive stage in the reduction process. Thus the battery capacity is reduced to fully discharge the battery in stages 1–13 to values of C/2, C/4, C/8/, C/16, C/32, C/64, C/128, C/256, C/512, C/1024, C/2048, C/4096, C/8192, where C is the rated battery capacity. The value of C/n also may be reduced by raising the temperature above its nominal value. For example, the process of reconditioning can be accomplished to fully discharge the batteries in fewer stages at a capacity of C/1024 for lithium ion batteries employing nickel oxide-based cathodes by raising the nominal temperature of the battery from about 20° C. (68° F.) to about 40° C. (105° F.). But in certain applications, such as space applications, it is not possible to control the nominal temperature of the battery for the time required to recondition the battery. The cell reached the state shown in FIG. 2 at 250. After recharging, the cell was restored to the state shown in FIG. 2 at 210. To complete the discharge to a capacity of C/8192, a time of about 2 weeks is required at a temperature of about 20° C. The discharging processing time can be reduced by increasing the temperature. Furthermore, the first step of the discharge cycle, to discharge the battery to a capacity of C/2 to the required voltage limit, is conducted at the required current for a time of about two hours. Each successive step is conducted at a lower current than the previous step and typically for a longer time, which provides time for the lithium ions to migrate. The discharge process can be conducted by any convenient means, such as by constantly increasing the resistance while lowering the current in successive steps to maintain the voltage at a constant rate. The discharge process of the present invention can be accomplished by connecting a power supply to the battery or cell in reverse connection as is well known. By maintaining the current at a constant value, an increased voltage in the power supply will result in a larger resistance applied across the cell.

Table 1, below, provides results for reconditioning of cells to different degrees of discharge. All of the cells were tested continuously tested through 250 cycles, being discharged for 1.2 hours and recharged for 4.8 hours. The different degrees of discharge are listed in column 1. At the end of the 250 cycles, the cells were fully discharged in accordance with the method set forth by the present invention. As can be seen, the cells exhibiting the deeper degree of discharge experienced the largest percent increase in capacity (C/2) Ah (Final) versus capacity C/2 Ah (Initial) when subjected to the (C/8192) Ah discharge and recharge of the present invention. The results support the previously discussed theory, as cells undergoing a deeper discharge should experience more of a skewing of the lithium atoms at the anode, as the lithium ions are allowed to migrate.

TABLE 1

| Degree of Discharge | C/2 Ah (initial) | C/8096 Ah | C/2 Ah (Final) | Percent Increase |
|---|---|---|---|---|
| 20% | 41.712 | 54.513 | 42.339 | 1.015 |
| 40% | 42.418 | 48.847 | 42.947 | 1.012 |
| 60% | 42.302 | 49.006 | 43.184 | 1.021 |
| 80% | 39.829 | 48.989 | 41.935 | 1.053 |

As noted above, certain variables will vary depending upon the specific materials comprising the elements of battery. For example, a lithium ion battery using a cobalt oxide-based positive electrode experiences a voltage step such as shown in FIG. 3 at about 0.5 volts, so that the process of the present invention must be accomplished at a voltage limit above about 0.5 volts. Thus, as can be seen, the critical voltage must be determined for each battery design. However, the principles of the present invention are effective for all lithium batteries, even though the specific critical variables will vary from design to design, and perhaps even among battery sizes for batteries of the same design.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for reconditioning a lithium ion battery having reduced capacity, comprising the steps of:
    providing a lithium ion battery from a lithium battery family, the battery including a negative electrode, a positive electrode, a nonconductive separator disposed between the negative electrode and the positive electrode, and a source of lithium and an electrolytic solution hermetically sealed in a container, and further including a negative terminal connected to the negative electrode and a positive terminal connected to the positive electrode extending through a face of the container to provide external connections;
    determining the voltage discharge profile for the lithium battery family to determine a characteristic voltage below a normal discharge voltage for which operation will result in a gradual loss of battery cell capacity leading to an inoperative cell, and selecting a voltage below the normal discharge voltage and above the characteristic voltage, wherein the selected voltage is sufficiently high so as not to damage a battery cell of the battery;
    slowly discharging the lithium ion battery to the selected voltage at a discharge rate sufficiently low to redistribute lithium ions in the negative electrode while substantially completely discharging the battery;
    providing a power source;
    connecting the power source to the negative terminal and the positive terminal of the battery;
    providing power to the battery from the power source to recharge the lithium ion battery so as to substantially uniformly redistribute the lithium ions in the positive electrode;
    wherein the capacity of the battery is substantially restored.

2. A method for reconditioning a lithium ion battery having reduced capacity, comprising the steps of:
    providing a power source;
    providing a lithium ion battery from a lithium battery family, the battery including a negative electrode, a positive electrode, a nonconductive separator disposed between the negative electrode and the positive electrode, and a source of lithium and an electrolytic solution hermetically sealed in a container, and further including a negative terminal connected to the negative electrode and a positive terminal connected to the positive electrode extending through a face of the container to provide external connections;
    determining the voltage discharge profile for the lithium battery family to determine a characteristic voltage below a normal discharge voltage for which operation will result in a gradual loss of battery cell capacity leading to an inoperative cell, and selecting a voltage below the normal discharge voltage and above the characteristic voltage, wherein the selected voltage is sufficiently high so as not to damage a battery cell of the battery;
    connecting the power source to the negative terminal and the positive terminal of the battery;
    slowly discharging the lithium ion battery to the selected voltage at a discharge rate sufficiently low to redistribute lithium at the negative electrode while substantially completely discharging the battery; and
    providing power to the battery from the power source to recharge the lithium ion battery so as to substantially uniformly redistribute the lithium in the positive electrode;
    wherein the capacity of the battery is substantially restored.

3. The method of claim 2 wherein the step of providing a lithium ion battery includes providing a metal oxide-based positive electrode.

4. The method of claim 3 wherein the step of providing a metal oxide-based positive electrode includes providing a nickel oxide-based positive electrode.

5. The method of claim 4 wherein the step of slowly discharging the battery includes slowly discharging the battery at a voltage above at least about 1.6 volts.

6. The method of claim 3 wherein the step of providing a metal oxide-based positive electrode includes providing a cobalt oxide-based positive electrode.

7. The method of claim 6 wherein the step of slowly discharging the battery includes slowly discharging the battery at a voltage above at least about 0.5 volts.

8. The method of claim 2 wherein the step of providing a lithium ion battery includes providing a carbonaceous negative electrode.

9. The method of claim 2 wherein the step of providing a lithium ion battery includes providing a battery having an electrolytic solution comprising $LiPF_6$, phosphor hexachloride and organic carbonate.

10. The method of claim 2 wherein the step of slowly discharging the lithium ion battery further includes the step of reducing the capacity of the battery in stages to a capacity value of C/n to the predetermined voltage, where C is the rated capacity of the battery.

11. The method of claim 10 wherein the step of reducing the capacity of the battery is performed in a plurality of stages.

12. The method of claim 11 wherein the plurality of stages is performed at a predetermined temperature, a number of stages in the plurality of stages required to fully discharge the battery dependent on the predetermined temperature and materials comprising the lithium ion battery provided.

13. The method of claim 10 wherein the negative electrode includes a negative current collector, wherein the step of slowly discharging the lithium ion battery includes discharging the battery to a voltage sufficiently high so as to prevent dissolving the negative current collector.

14. A method for reconditioning a lithium ion battery having reduced capacity, comprising the steps of:
    providing a power source;
    providing a lithium ion battery from a battery family, the battery including a carbonaceous negative electrode having a current collector, a nickel oxide-based positive electrode having a current collector, a nonconductive separator disposed between the negative electrode and the positive electrode, and a source of lithium and an electrolytic solution hermetically sealed in a container, and further including a negative terminal connected to the negative electrode and a positive terminal connected to the positive electrode extending through a face of the container to provide external connections;

determining the voltage discharge profile for the lithium battery family to determine a characteristic voltage below a normal discharge voltage for which operation will result in a gradual loss of battery cell capacity leading to an inoperative cell, and selecting a voltage below the normal discharge voltage and above the characteristic voltage, wherein the selected voltage is sufficiently high so as not to damage a battery cell of the battery;

connecting the power source to the negative terminal and the positive terminal of the battery;

slowly discharging the lithium ion battery to the selected voltage at a discharge rate sufficiently low to redistribute lithium ions at the negative electrode while substantially completely discharging the battery; and providing power to the battery from the power source to recharge the lithium ion battery so as to uniformly redistribute the lithium ions in the positive electrode;

wherein the capacity of the battery is restored.

15. The method of claim 14 wherein the step of providing a lithium ion battery includes providing a battery having an electrolytic solution comprising $LiPF_6$, phosphor hexachloride and organic carbonate.

16. The method of claim 14 wherein the step of slowly discharging the lithium ion battery further includes the step of reducing the capacity of the battery in stages to C/n until the predetermined voltage limit is reached.

17. The method of claim 16 wherein the step of reducing the capacity of the battery is performed by discharging the battery in a plurality of stages.

18. The method of claim 17 wherein the plurality of stages is performed at a predetermined temperature, a number of stages in the plurality of stages required to substantially fully discharge the battery dependent on the predetermined temperature.

19. The method of claim 18 wherein the battery is fully discharged at the predetermined temperature of about 20° C. at a capacity of C/8192, where C is the rated capacity of the battery.

20. The method of claim 18 wherein the battery is fully discharged at the predetermined temperature of about 40° C. at a capacity of about C/1024 where C is the rated capacity of the battery.

21. The method of claim 14 wherein the predetermined voltage is in the range of about 2.0 volts to about 2.7 volts.

22. The method of claim 17 wherein the battery is discharged in each stage to a value of C/n, where n is a value of about $2^x$, and x corresponds to the stage, up to a thirteenth stage wherein the battery is fully discharged.

23. A. reconditioned lithium ion battery comprising:

a carbonaceous negative electrode having a current collector;

a metal oxide-based positive electrode having a surface and that includes a current collector;

a nonconductive separator disposed between the negative electrode and the positive electrode;

a source of lithium;

and an electrolytic solution hermetically sealed in a container;

the battery further including a negative terminal connected to the negative electrode and a positive terminal connected to the positive electrode extending through a face of the container to provide external connections; and wherein the reconditioned battery is characterized by a substantially uniform distribution of lithium over the surface of the positive electrode after substantially fully discharging the battery followed by recharging the battery.

* * * * *